United States Patent
Adachi

(10) Patent No.: US 10,249,055 B2
(45) Date of Patent: Apr. 2, 2019

(54) IMAGE PROCESSING APPARATUS, IMAGE PROCESSING METHOD AND PROGRAM

(71) Applicant: CANON KABUSHIKI KAISHA, Tokyo (JP)

(72) Inventor: Keiji Adachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/584,440

(22) Filed: May 2, 2017

(65) Prior Publication Data

US 2017/0316575 A1    Nov. 2, 2017

(30) Foreign Application Priority Data

May 2, 2016    (JP) .................. 2016-092680

(51) Int. Cl.

| G06K 9/00 | (2006.01) |
|---|---|
| G06T 7/70 | (2017.01) |
| G06T 7/11 | (2017.01) |
| G06T 5/50 | (2006.01) |
| G06T 7/73 | (2017.01) |
| G06T 7/174 | (2017.01) |
| G06T 7/254 | (2017.01) |
| G06T 7/194 | (2017.01) |

(52) U.S. Cl.
CPC .................. *G06T 7/70* (2017.01); *G06T 5/50* (2013.01); *G06T 7/11* (2017.01); *G06T 7/174* (2017.01); *G06T 7/194* (2017.01); *G06T 7/254* (2017.01); *G06T 7/73* (2017.01); *G06T 2207/10016* (2013.01); *G06T 2207/10021* (2013.01); *G06T 2207/20221* (2013.01); *G06T 2207/30196* (2013.01); *G06T 2207/30232* (2013.01)

(58) Field of Classification Search
CPC ............ G06T 2207/30232; G06T 2207/30196
See application file for complete search history.

(56) References Cited

U.S. PATENT DOCUMENTS

| 2007/0279494 | A1* | 12/2007 | Aman | ................... | G01S 3/7864 |
|---|---|---|---|---|---|
| | | | | | 348/169 |
| 2010/0189343 | A1* | 7/2010 | Berrill | ................... | G06K 9/209 |
| | | | | | 382/154 |
| 2012/0320162 | A1* | 12/2012 | Lo | ........................ | G06T 7/564 |
| | | | | | 348/47 |

(Continued)

FOREIGN PATENT DOCUMENTS

JP    2011130203 A    6/2011

*Primary Examiner* — Oneal R Mistry
(74) *Attorney, Agent, or Firm* — Canon U.S.A., Inc. IP Division

(57) ABSTRACT

According to various embodiments, based on a plurality of images respectively captured by a plurality of cameras, an image processing apparatus estimates three-dimensional positions of specific objects in the images. The image processing apparatus extracts a first area and second area in the images based on the estimated three-dimensional positions of the specific objects. The first area includes specific objects within a predetermined three-dimensional area, while the second area includes specific objects outside of the three-dimensional area. Furthermore, the image processing apparatus specifies an overlapping area of the first area and second area. Then, the image processing apparatus carries out image processing on the first area including the overlapping area.

17 Claims, 13 Drawing Sheets

(56) References Cited

U.S. PATENT DOCUMENTS

| | | | |
|---|---|---|---|
| 2014/0072170 A1* | 3/2014 | Zhang | G06K 9/00369 382/103 |
| 2016/0140399 A1* | 5/2016 | Yano | G06K 9/00778 382/103 |
| 2016/0283798 A1* | 9/2016 | Goldner | G06K 9/00778 |
| 2016/0373699 A1* | 12/2016 | Torres | G05D 1/0038 |

* cited by examiner

IMAGE PROCESSING APPARATUS, IMAGE PROCESSING METHOD AND PROGRAM

BACKGROUND

Field

The present disclosure relates to an image processing apparatus, an image processing method, and a program.

Description of the Related Art

In recent years, surveillance cameras have become popular. With the popularity of the surveillance cameras, it has become easier for strangers to look at individual figures reflected in images (video images) captured by the surveillance cameras in public places, which is a problem terms of privacy.

Therefore, the following technique has been proposed. That is, a specific person to be under surveillance is extracted from an image captured by a camera and the extracted specific person is displayed so as to protect privacy of other persons. Japanese Patent Laid-Open No. 2011-130203 discloses a technique for extracting an abnormally-acting person as a specific person by evaluating feature amounts representing actions and conditions of persons in a captured image.

However, according to the technique disclosed in Japanese Patent Laid-Open No. 2011-130203, among other things, persons whose privacy is to be protected may be displayed when normal conditions are mistakenly recognized as abnormal conditions.

SUMMARY

Various embodiments can appropriately distinguish a specific object from other objects in a captured image and carry out appropriate image processing.

According to one embodiment, an image processing apparatus includes: an acquiring unit configured to acquire a plurality of images respectively captured by a plurality image capturing units; a first estimating unit configured to estimate three-dimensional positions of specific objects in the images based on the plurality of images acquired by the acquiring unit; an extracting unit configured to extract a first area and a second area based on the three-dimensional positions of the specific objects estimated by the first estimating unit, the first area including specific objects outside of a predetermined three-dimensional area and the second area including specific objects within the predetermined three-dimensional area in the images; a specifying unit configured to specify an overlapping area of the first area and the second area; and an image processing unit configured to carry out image processing on the first area including the overlapping area specified by the specifying unit.

Further features will become apparent from the following description of exemplary embodiments (with reference to the attached drawings).

DESCRIPTION OF THE EMBODIMENTS

An embodiment will now be described in detail with reference to the accompanying drawings.

Note that the embodiment described hereinafter is an example embodiment but the present disclosure is not limited to this embodiment. Various other embodiments can achieve their object by making appropriate corrections or modifications depending on structures of devices or various conditions applied in the present disclosure. Furthermore, it should be noted that the present disclosure is not restricted to the following embodiment.

First Embodiment

Figure 1:
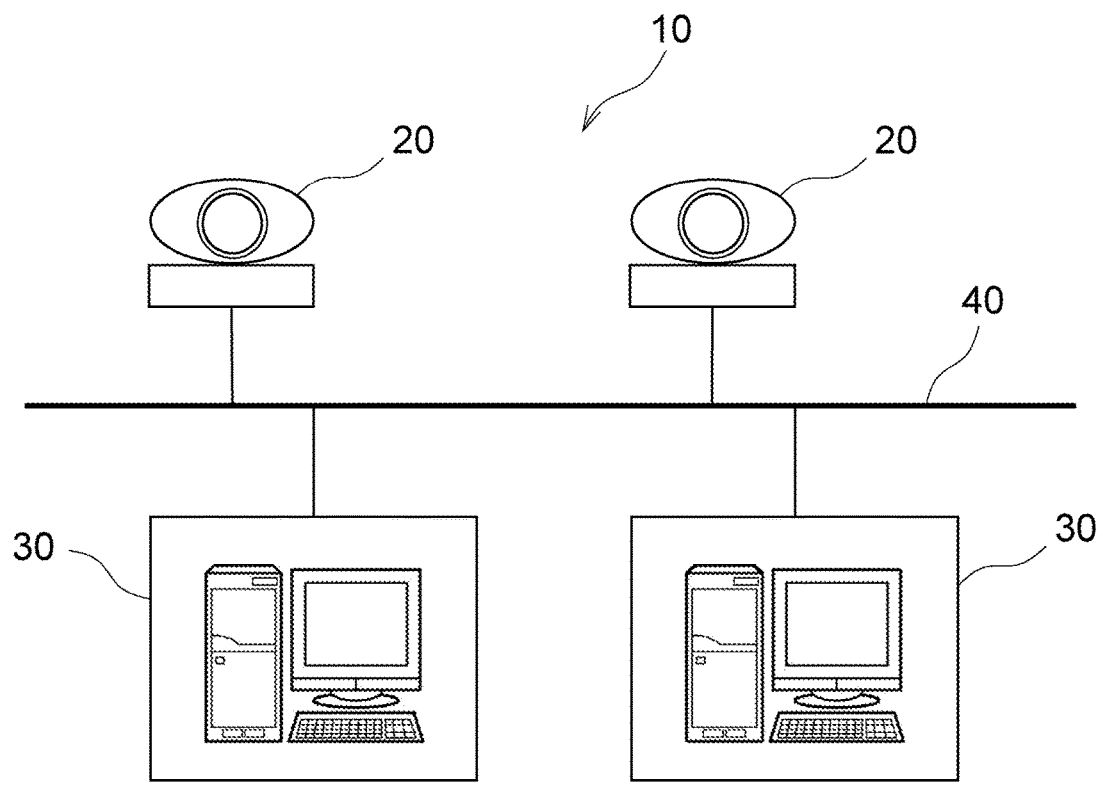
FIG. 1 is a view of network connection showing an example of an image processing system according to one embodiment.

FIG. 1 is a configuration diagram of network connection showing an example of an operational environment of an image processing system in the present embodiment. Herein, the image processing system is applied to a network camera system.

A network camera system 10 includes at least two network cameras (hereinafter simply referred to as "cameras") 20, and at least one image processing apparatus 30. The cameras 20 and the image processing apparatus 30 are connected by a local area network (LAN) 40, a network channel. It should be noted that the network channel is not restricted to the LAN and may be Internet, a wide area network (WAN), and the like. A physical connection form to the LAN 40 may be wired or wireless. Furthermore, each of the two cameras 20 and two image processing apparatuses 30 are connected to the LAN 40 in FIG. 1, but the number of connected units is not restricted to the number shown in FIG. 1.

The cameras 20 are image capturing apparatuses such as surveillance cameras configured to capture subjects at predetermined viewing angles. A plurality of cameras 20 is provided at viewing angles in which visual fields are overlapping so as to capture an identical subject simultaneously. Furthermore, the cameras 20 can transmit captured images (hereinafter simply referred to as "images") to the image processing apparatus 30 over the LAN 40.

The image processing apparatus 30 includes, for example, a personal computer (PC) and can be operated by a user (for example, a surveillance agent). This image processing apparatus 30 carries out image analysis for detecting objects (including human bodies), which meet predetermined conditions, from the images captured by the cameras 20. Herein, the image analysis involves at least one of moving-body detection, moving-body chasing, object-area detection, human-body detection, face recognition, and the like.

Furthermore, the image processing apparatus 30 has a display control function in order to display on a displaying, unit (display) images delivered from the cameras 20 or image processing results to be mentioned later. The image processing apparatus 30 may also include an input unit configured to carry out an operation for setting parameters such as areas relating to the image analysis.

Figure 2:
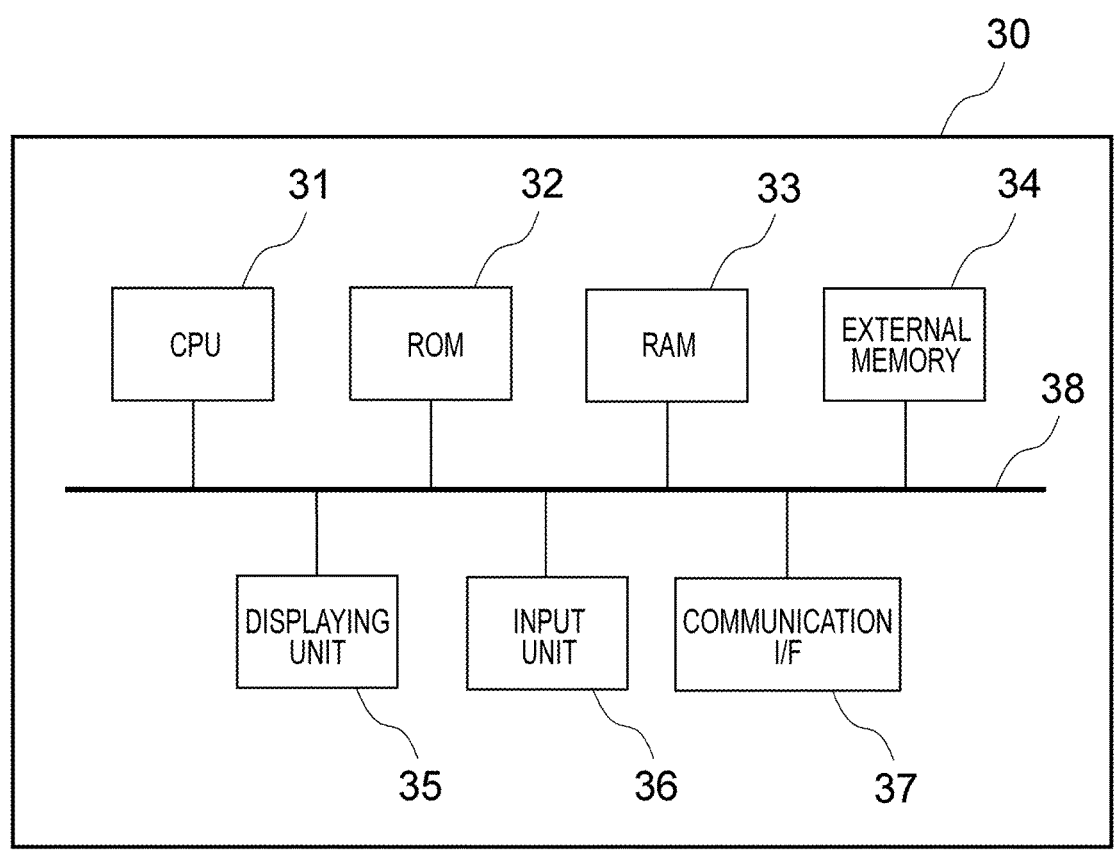
FIG. 2 is a diagram showing an example of a hardware configuration of an image processing apparatus according to one embodiment.

FIG. 2 is a diagram showing a hardware configuration of the image processing apparatus 30.

The image processing apparatus 30 includes a CPU 31, ROM 32, RAM 33, external memory 34, displaying unit 35, input unit 36, communication I/F 37, and system bus 38.

The CPU 31 carries out overall control on operations in the image processing apparatus 30 and controls each structural unit (32 to 37) through the system bus 38. The ROM 32 is a nonvolatile memory configured to store control programs and the like necessary for the CPU 31 to carry out processing. It should be noted that the programs may be stored in the external memory 34 or a detachable storage medium (not shown). The RAM 33 functions as a main memory and working area of the CPU 31. In other words, when carrying out the processing, the CPU 31 loads a necessary program from the ROM 32 into the RAM 33 and executes the loaded program so as to carry out various functional operations.

The external memory 34 stores various data and various information necessary for the CPU 31 to carry out processing using programs. Furthermore, the external memory 34 stores various data and various information obtained by the CPU 31 carrying out the processing using the program. The displaying unit 35 includes a monitor such as a liquid crystal display (LCD). The input unit 36 includes a pointing device such as a keyboard and mouse. The communication I/F 37 is an interface for communicating with an external apparatus (the cameras 20 herein). The communication I/F 37 is, for example, a LAN interface. The system bus 38 connects the CPU 31, ROM 32, RAM 33, external memory 34, displaying unit 35, input unit 36, and communication I/F 37 so that these units can communicate with each other.

In a case of employing the cameras 20, it should be noted that the image processing apparatus 30 is provided with an image capturing unit as the hardware configuration in addition to the structure shown in FIG. 2. Herein, the image capturing unit is configured to capture subjects and includes an imaging device such as a complementary metal oxide semiconductor (CMOS), and charge coupled device (COD). Furthermore, in a case of employing the cameras 20, the image processing apparatus 30 may be provided with a power supply button and various setting buttons as the input unit instead of the keyboard and the like.

Figure 3:
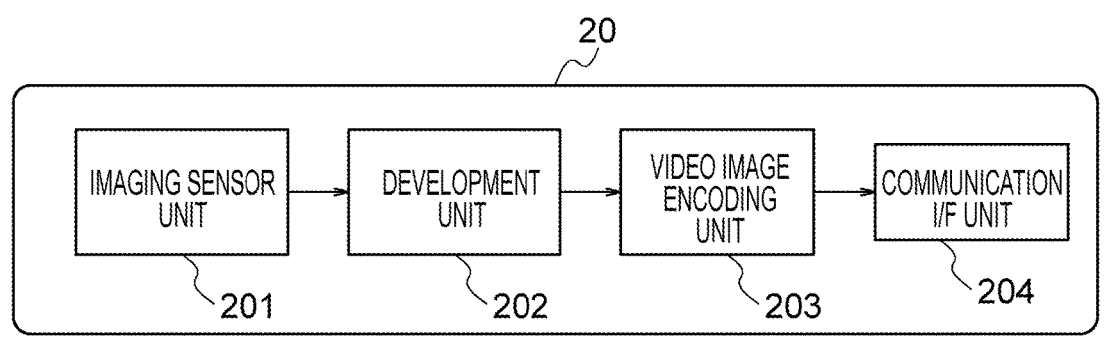
FIG. 3 is a block diagram showing functions of an image capturing apparatus according to one embodiment.

FIG. 3 is a block diagram showing functions of each camera 20. Each camera 20 includes an imaging sensor unit 201, development unit 202, video image encoding unit 203, and communication I/F unit 204. A function of each unit in each camera 20 shown in FIG. 3 may be performed with a CPU in each camera 20 executing a program. It should be noted that at least one of elements shown in FIG. 3 may operate as dedicated hardware. In such a case, the dedicated hardware operates based on control of the CPU in each camera 20.

The imaging sensor unit 201 converts an optical image formed on an image sensing surface of the image capturing unit into digital electric signals by photoelectric conversion. The imaging sensor unit 201 then outputs the digital electric signals to the development unit 202. The development unit 202 carries out predetermined pixel interpolation and color conversion with respect to the digital electric signals photoelectrically converted by the imaging sensor unit 201. The development unit 202 then generates a digital image of RGB or YUV and the like. Furthermore, the development unit 202 carries out predetermined calculation processing using the digital image after development. Based on the obtained calculation results, the development unit 202 carries out video image processing such as white balance, sharpness, contrast, and color conversion.

The video image encoding unit 203 carries out compression for delivery, frame rate setting, and the like with respect to digital video image signals input from the development unit 202 so as to encode the same. Herein, a compressing technique for delivery is based on standards such as MPEG 4, H.264, MJPEG, and JPEG. The video image encoding unit 203 files video image data in an mp4 format, mov format, and the like. The communication I/F unit 204 controls an interface for communicating with an external apparatus (the image processing apparatus 30 herein) and communicates with the external apparatus.

Figure 4:
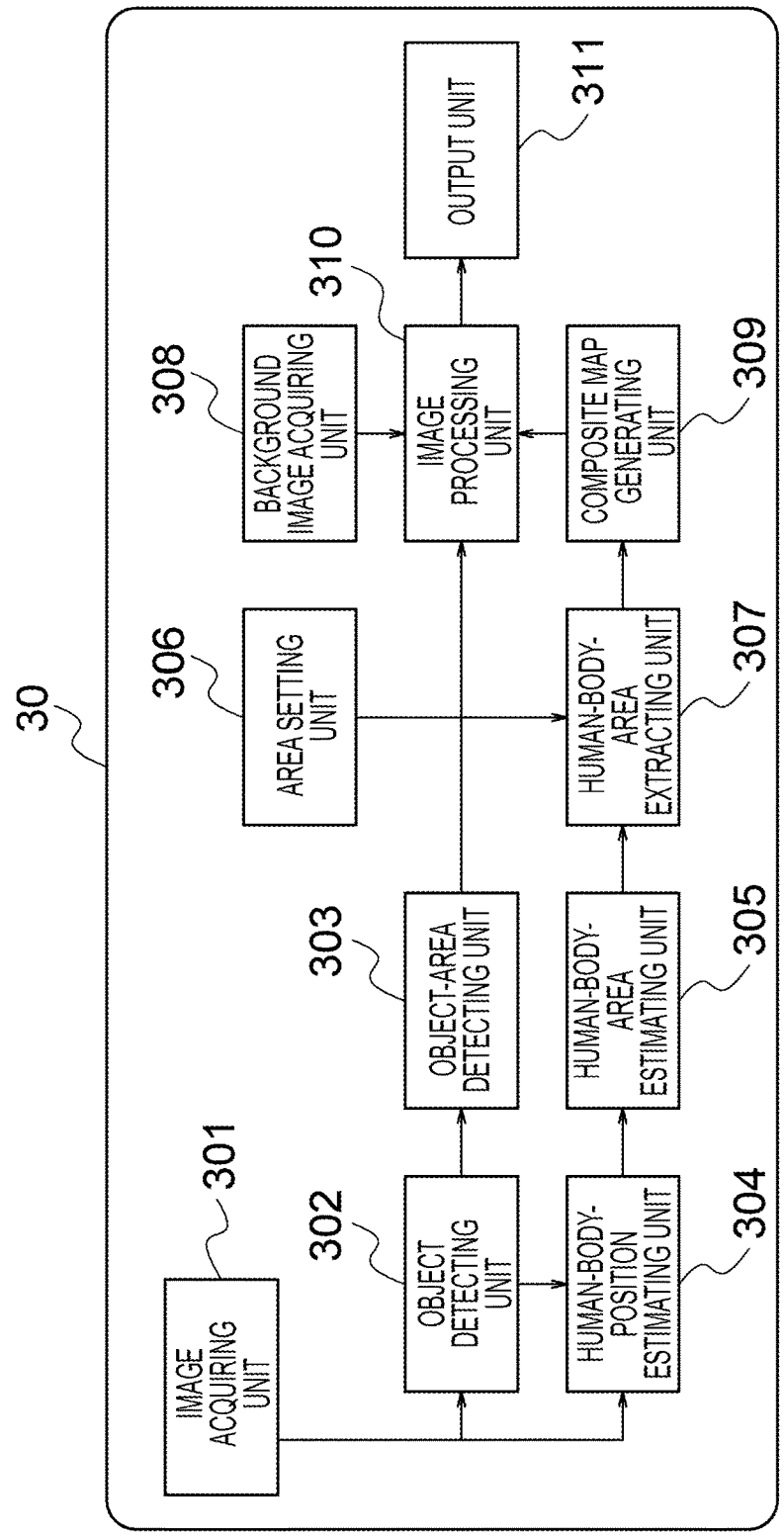
FIG. 4 is a block diagram sowing functions of the image processing apparatus according to one embodiment.

FIG. 4 is a block diagram showing functions of the image processing apparatus 30. The image processing apparatus 30 carries out the image analysis based on the images captured by the plurality of cameras 20 and distinguishes objects within a predetermined specific area from other objects in the images.

Specifically, based on a plurality of images captured by the plurality of cameras 20, the image processing apparatus 30 estimates three-dimensional positions of specific objects included in the objects in the images. The image processing apparatus 30 then distinguishes specific objects within a predetermined three-dimensional area from specific objects out of the three-dimensional area. Herein, human bodies are regarded as the specific objects. In regard to the human bodies within the three-dimensional area, the image processing apparatus 30 displays the captured images as it is in regard to other objects including human bodies, the image processing apparatus 30 carries out image processing such as abstraction processing in order to protect their privacy.

Herein applied is the image processing apparatus, but a video image processing apparatus is also applicable. This is because processing contents are similar even though the video image processing apparatus acquires video images and carries out image processing per frame with respect to each frame (image) in the video images.

The image processing apparatus 30 includes an image acquiring unit 301, object detecting unit 302, object-area detecting unit 303, human-body-position estimating unit 304, human-body-area estimating unit 305, area setting unit 306, and human-body-area extracting unit 307. The image processing apparatus 30 further includes a background image acquiring unit 308, composite map generating unit 309, image processing unit 310, and output unit 311. A function of each unit in the image processing apparatus 30 shown in FIG. 4 may be performed with the CPU 31 shown in FIG. 2 executing a program. It should be noted that at least one of elements shown in FIG. 4 may operate as dedicated hardware. In such a case, the dedicated hardware operates based on control of the CPU 31.

Figure 5:
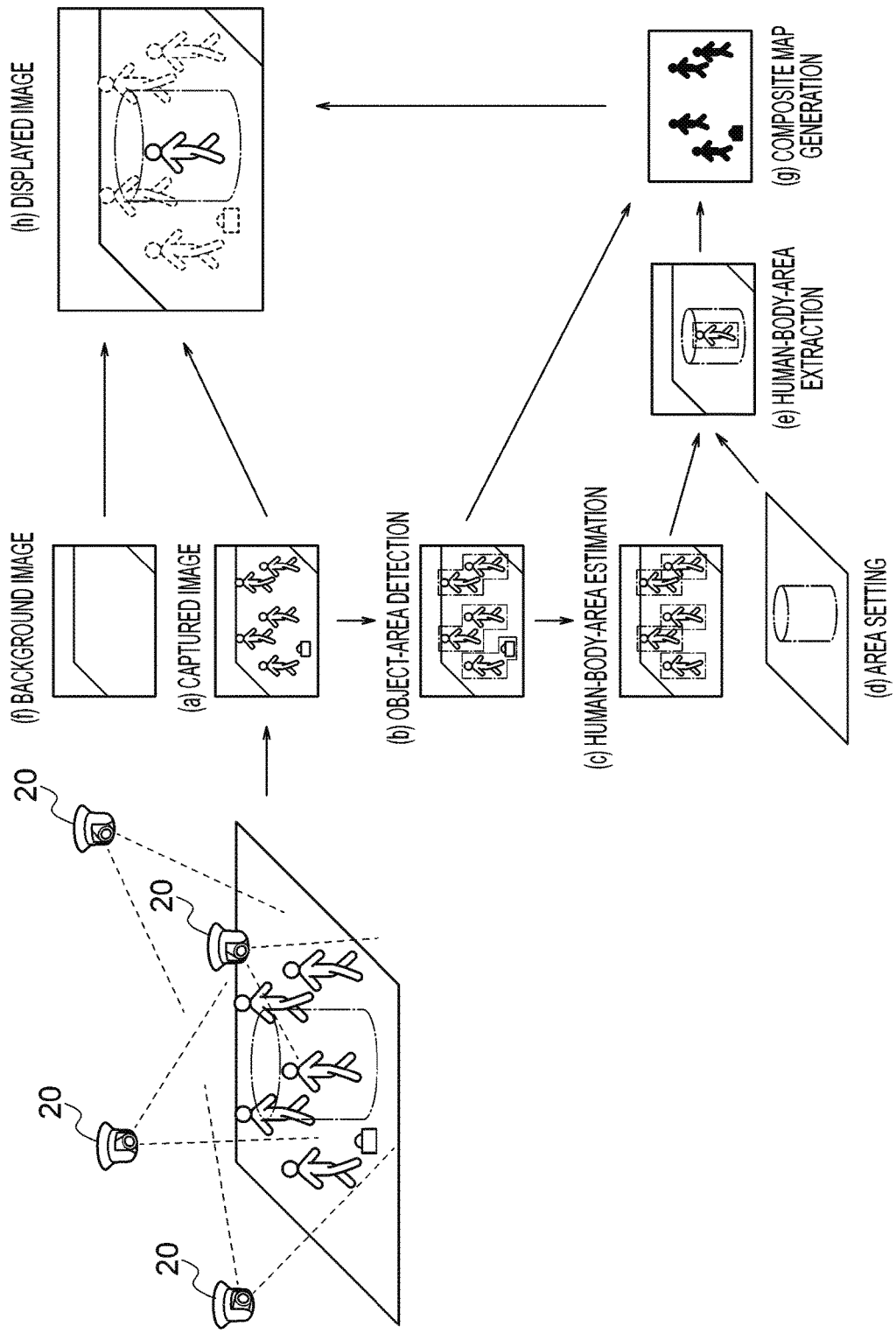
FIG. 5 is a view describing a flow of image processing carried out by the image processing apparatus according to one embodiment.

The image acquiring unit 301 receives video image data transmitted from the cameras 20 and elongates and decodes the video image data so as to acquire images (moving images or still images) ((a) of FIG. 5). The image acquiring unit 301 then sequentially transmits the acquired images to the object detecting unit 302.

It should be noted that an image source is not specifically restricted. The image source may be a server apparatus configured to supply images with wires or without any wires or may be a recorded image managing apparatus. Alternatively, the image source may be an image capturing apparatus other than the cameras 20. Furthermore, the image acquiring unit 301 may be configured to acquire images from a memory inside the image processing apparatus 30 (for example, the external memory 34). Hereinafter described is a case where the image acquiring unit 301 transmits one image to the object detecting unit 302 regardless of whether the image acquiring unit 301 acquires a moving image or a still image. In the former case, the aforementioned one image corresponds to each frame included in the moving image. In the latter case, the aforementioned one image corresponds to the still image.

Based on the image acquired by the image acquiring unit 301, the object detecting unit 302 detects objects in the image by a background difference method. The object detecting unit 302 then outputs information regarding the detected objects to the object-area detecting unit 303. It should be noted that an approach for detecting objects is not specifically restricted to the background difference method and any techniques can be appropriately applied as long as objects in an image can be detected.

The object-area detecting unit 303 detects areas (object-areas) in the image of the objects detected by the object detecting unit 302 ((b) of FIG. 5). Herein, the object-areas are moving areas in the image and include the detected objects. Information of the object-areas includes information regarding positions and sizes in the image.

The human-body-position estimating unit 304 detects human bodies. In detecting human bodies, determined are areas of human bodies among the areas in the image of the objects detected by the object detecting unit 302 (the object-areas detected by the object-area detecting unit 303). Next, based on the images captured by the plurality of cameras 20 and acquired from the image acquiring unit 301, the human-body-position estimating unit 304 estimates human-body-positions in a three-dimensional space by triangulation with respect to the detected human bodies. Accordingly, three-dimensional positions (estimated human-body-positions) of the human bodies in the image are estimated. Herein, the human-body-position estimating unit 304 estimates the three-dimensional positions of parietal regions of the human bodies as the estimated human-body-positions.

Based on the estimated human-body-positions estimated by the human-body-position estimating unit 304, in regard to the image acquired from the image acquiring unit 301, the human-body-area estimating unit 305 estimates areas (estimated human-body-areas) presumed to be including the human bodies in the image ((c) of FIG. 5). Each estimated human-body-area is a specific object-area having a predetermined shape (for example, rectangular shape) including each detected human body (specific object).

As the human-body-position estimating unit 304 detects the human bodies and estimates the human-body-positions, facial sizes and stature can be acquired in addition to the positions of the parietal regions of the human bodies. Therefore, the human-body-area estimating unit 305 can estimate, as the estimated human-body-areas, rectangular ranges based on the positions of the parietal regions of the human bodies. The estimated human-body-areas estimated by the human-body-area estimating unit 305 are included in the object-areas detected by the object-area detecting unit 303.

The area setting unit 306 sets a predetermined three-dimensional area in a real space (three-dimensional space) ((d) of FIG. 5). Herein, the three-dimensional area is an area where a person who has intruded this area is regarded as a suspicious character or a person to be under surveillance (to be displayed). For example, an area including an important place (an important gate and the like) can be set as the three-dimensional area. This three-dimensional area may have any shapes such as a cylindrical shape or cubic shape. Furthermore, a user of the image processing apparatus 30 may operate the input unit 36 to set this three-dimensional area. Alternatively, this three-dimensional area may be stored in advance in a memory inside the image processing apparatus 30.

Based on the estimated human-body-areas estimated by the human-body-area estimating unit 305, the human-body-area extracting unit 307 determines whether each detected human body is a human body within the three-dimensional area set by the area setting unit 306. The human-body-area extracting unit 307 then extracts a specific human-body-area from the estimated human-body-areas based on determination results. Herein, the human-body-area extracting unit 307 extracts an estimated human-body-area corresponding to the human body within the three-dimensional area as the human-body-area ((e) of FIG. 5).

The background image acquiring unit 308 acquires an image of a background (background image) including no subjects and stored in the memory in advance ((f) of FIG. 5).

The composite map generating unit 309 generates a composite map based on information regarding the object-areas detected by the object-area detecting unit 303 and the human-body-areas extracted by the human-body-area extracting unit 307 ((g) of FIG. 5). The composite map is used when combining the image (captured image) acquired by the image acquiring unit 301 and the background image acquired by the background image acquiring unit 308. Specifically, the composite map is a map showing a ratio of combining the captured image and background image in each pixel.

Herein, the composite map generating unit 309 generates a composite map. In the composite map, abstracted are the estimated human-body-areas excluding the human-body-area extracted by the human-body-area extracting unit 307 among the object-areas detected by the object-area detecting unit 303. An applicable example of the abstraction processing includes transparency processing in which the background image is displayed. Specifically, the transparency processing includes one that makes human-body-areas translucent with a predetermined color. Furthermore, in regard to the human-body-areas extracted by the human-body-area extracting unit 307, the composite map generating unit 309 generates a composite map in which the capture image is displayed as it is.

The image processing unit 310 combines the captured image acquired by the image acquiring unit 301 and the background image acquired by the background image acquiring unit 308 using the composite map generated by the composite map generating unit 309 ((h) of FIG. 5). Accordingly, generated is a displayed image in which the human body within the three-dimensional area set by the area setting unit 306 is displayed as it while the human bodies out of the three-dimensional area and objects other than the human bodies in the image are made transparent so as not to be displayed. In other words, this displayed image is an image which protects privacy of the objects (including human bodies) other than the human body within the three-dimensional area.

The output unit 311 outputs to the displaying unit 35 the displayed image where the image processing is applied, generated by the image processing unit 310, so as to display the displayed image on the displaying unit 35.

Hereinafter, operations of the image processing apparatus 30 will be described with reference to FIG. 6.

Figure 6:
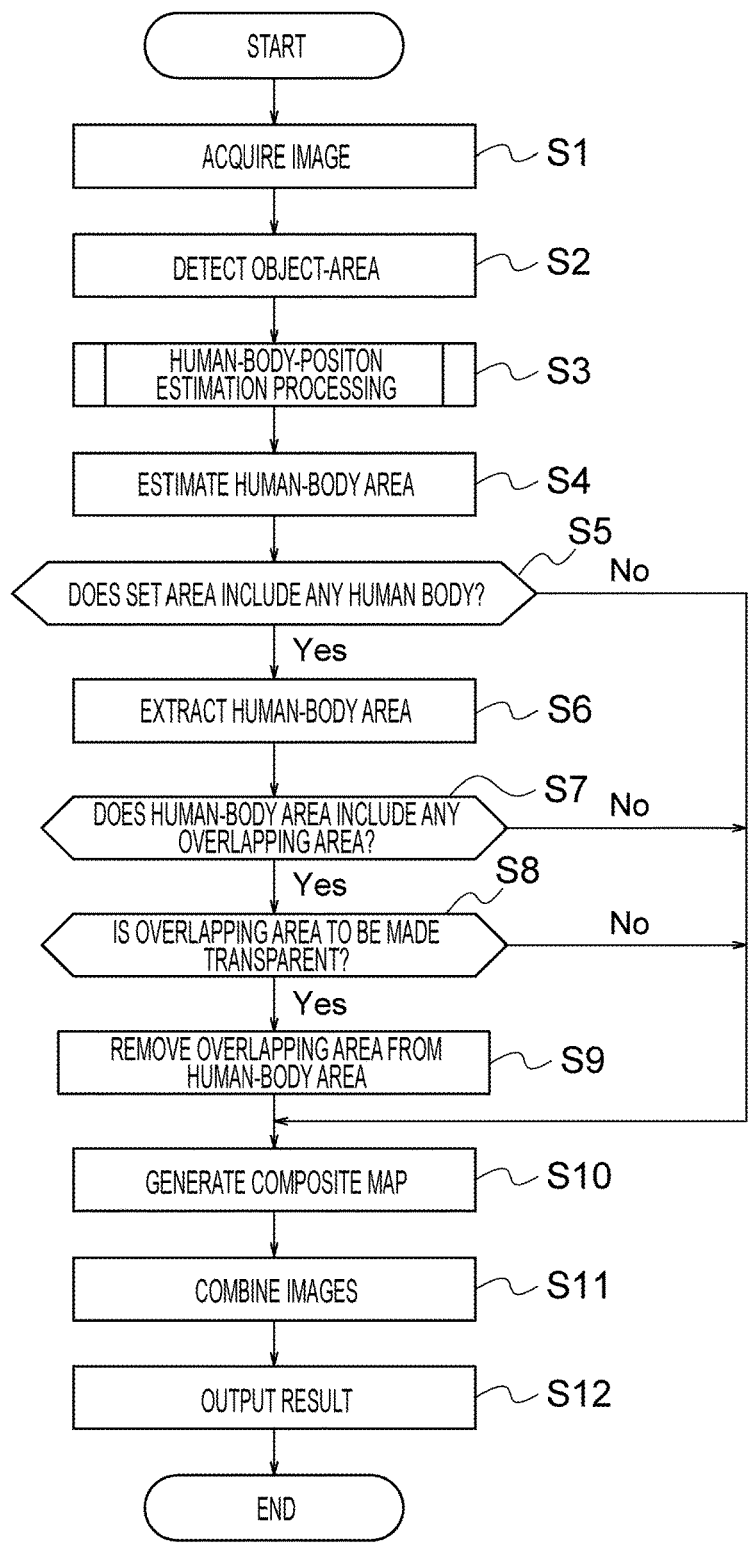
FIG. 6 is a flowchart describing operations of the image processing apparatus according to one embodiment.

Steps shown in FIG. 6 start, for example, when images are transmitted from the cameras 20. The steps are repeated every time the images are transmitted from the cameras 20. It should be noted that a start timing of the steps shown in FIG. 6 is not restricted to the aforementioned timing. The image processing apparatus 30 may carry out each step shown in FIG. 6 by the CPU 31 reading out a necessary program and executing the program.

As mentioned above, it should be noted that at least one of the elements shown in FIG. 4 may operate as the dedicated hardware so as to carry out the steps shown in FIG. 6. In such a case, the dedicated hardware operates based on control of the CPU 31. Hereinafter, the alphabet S denotes each step in the flowchart.

First, in S1, the image acquiring unit 301 acquires images simultaneously captured by the plurality of cameras 20. The reason for this is that a shift in capturing time between the plurality of images causes inaccurate estimation on human-body-positions of moving human bodies while estimating the human-body-positions, namely, while estimating the three-dimensional positions of the human bodies based on the plurality of images. Applicable examples of an approach for guaranteeing simultaneity includes a technique for simultaneously receiving camera images and a technique for utilizing information regarding capturing time included in additive data of images.

Figure 7:
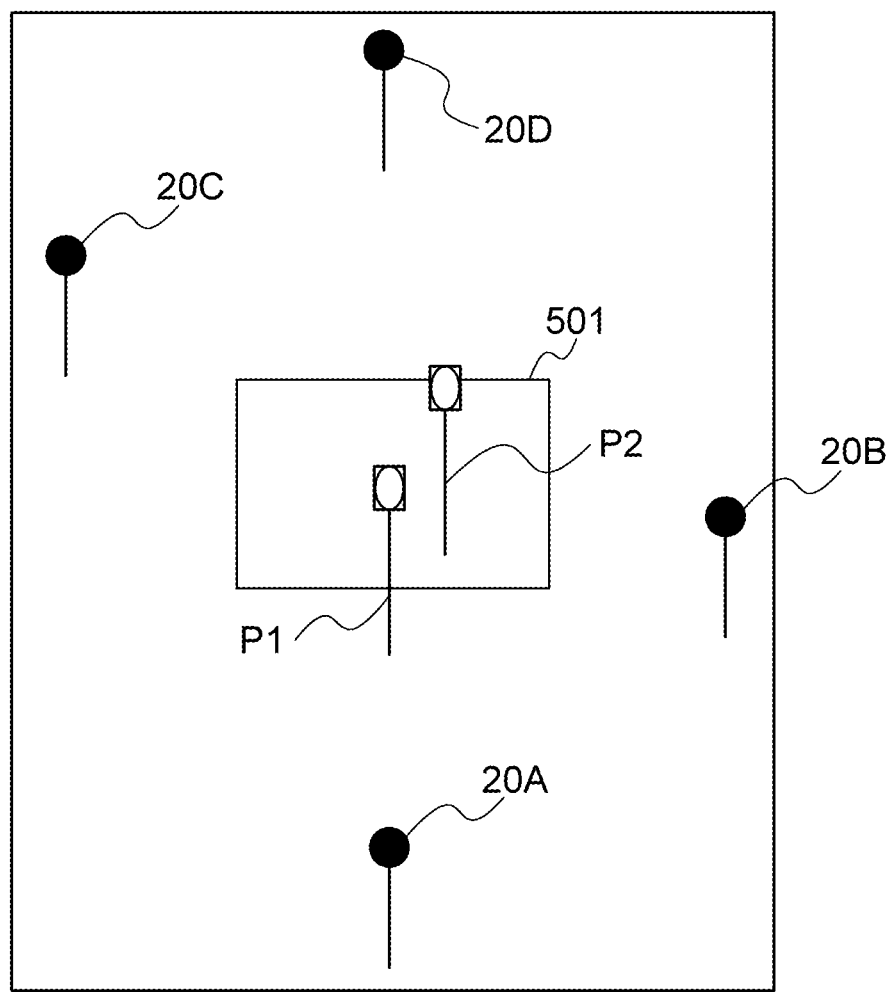
FIG. 7 is a view showing exemplary positions of cameras according to one embodiment.

FIG. 7 is a view showing exemplary positions of the plurality of cameras 20 (20A to 20D). Four cameras 20A to 20D are provided at viewing angles in which visual fields are overlapping so that an identical subject can be captured simultaneously. In FIG. 7, the four cameras 20A to 20D are provided at viewing angles in which persons F1 and P2 as well as an area 501 can be captured simultaneously. The area 501 is the three-dimensional area set by the area setting unit 306. In FIG. 7, the area 501 is cubic-shaped, having sufficiently high height with a rectangular bottom face. In a case of providing the cameras as in FIG. 7, the image acquiring unit 301 acquires images from each of the four cameras 20A to 20D in S1.

In S2, based on the images acquired in S1, the object detecting unit 302 detects objects in the images by the background difference method, and the object-area detecting unit 303 detects object-areas including the objects detected in the images. Herein, as mentioned above, the object-areas are the moving areas.

Figure 8:
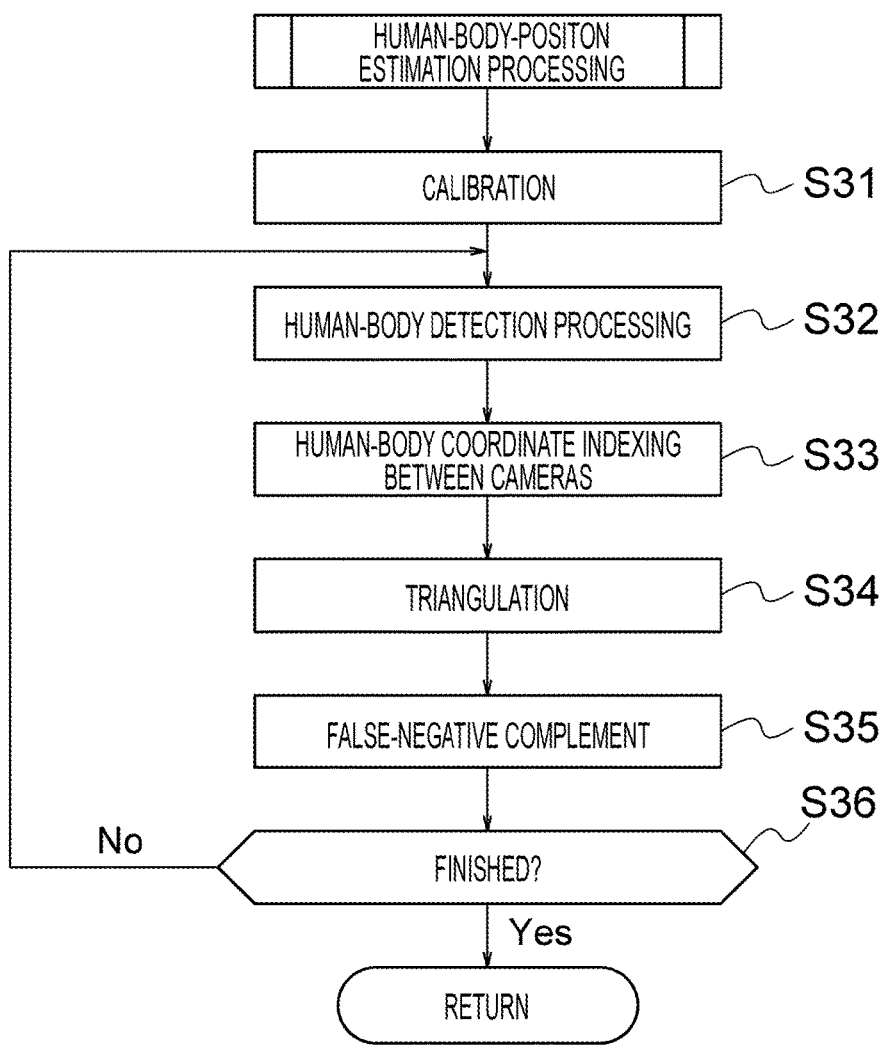
FIG. 8 is a flowchart describing steps for estimating human-body-positions according to one embodiment.

In S3, based on the plurality of images acquired in S1, the human-body-position estimating unit 304 estimates the human-body-positions using the triangulation with respect to the captured human bodies. This estimation of the human-body-positions will be described in detail with reference to FIG. 8.

First, in S31, the human-body-position estimating unit 304 calibrates for associating coordinates on the images of the objects captured by the plurality of cameras 20 with actual coordinates in the three-dimensional space of the objects. For example, coordinates $(X_1, Y_1, Z_1)$ on an image of a person P captured by the camera 20A in FIG. 9 and actual coordinates $(X_a, Y_a, Z_a)$ of the person P in the three-dimensional space are associated with each other. Similar calibration is carried out with respect to the cameras 20B and 20C provided within a range under surveillance.

Figure 9:
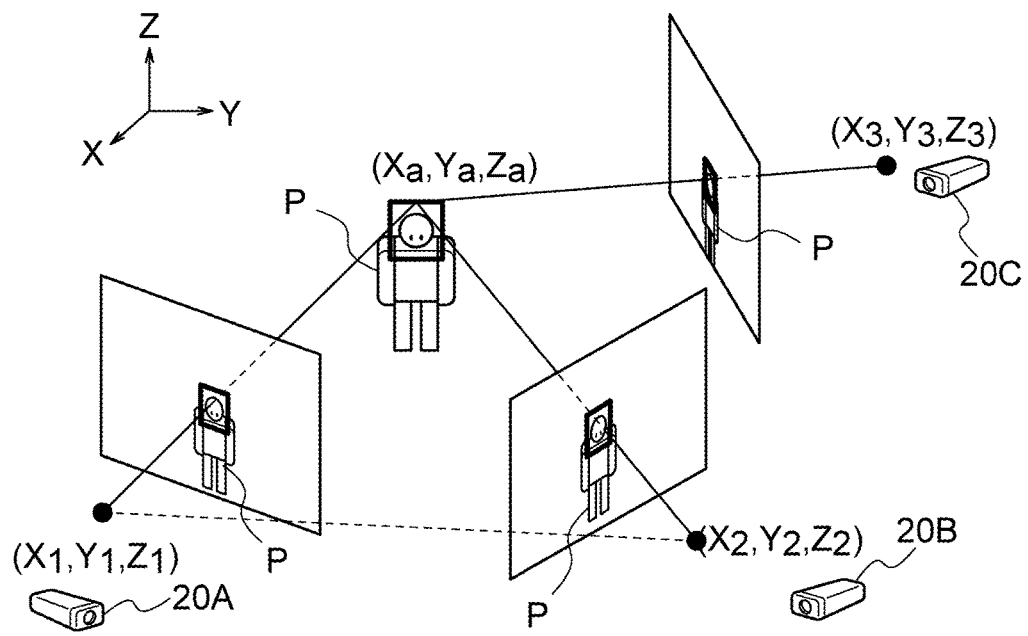
FIG. 9 is a view explaining calibration in estimating human-body-positions according to one embodiment.

When calibrating as mentioned above, it should be noted that positional coordinates in the three-dimensional space used for the association are measured and stored in advance. A position of an object used for the association may be a partial region of an identical human body as shown in FIG. 9. Alternatively, the position of the object used for the association may be a central part of a face or a central point of shoulders of the identical human body, or may be a central point of the human body. Furthermore, the position of the object used for the association may be a position of an object other than the human body. In such a case, it is preferable to remark common points of an identical object to be under surveillance. Herein applicable are marked predetermined positions randomly set within a range in the three-dimensional space, and actual positions of the cameras. Due to the calibration, when estimating three-dimensional positional coordinates of the human bodies (to be mentioned later) (S34), it is possible to acquire actual distances (for example, heights from floor faces to the parietal regions=stature) in the captured images.

Referring back to FIG. 8, in S32, the human-body-position estimating unit 304 detects the human bodies from the images. Specifically, the human-body-position estimating unit 304 uses a collation pattern dictionary and the like stored in advance and detects the human bodies with respect to the object-areas detected by the object-area detecting unit 303. It should be noted that the detection of human bodies should not be restricted to the pattern mentioned above as long as human bodies can be detected from images.

Furthermore, in the present embodiment, the specific objects whose three-dimensional positional coordinates are to be estimated are regarded as the human bodies, but they should not be restricted thereto. The specific objects may be human faces, automobiles, animals, number plates, soccer balls, and the like. Furthermore, a specific-object detecting unit configured to detect various types of specific objects may also be provided. Alternatively, a plurality of specific objects may be detected when plural detection can be carried out simultaneously. Furthermore, the areas including the human bodies to be detected are not necessarily the object-areas detected by the object-area detecting unit 303. For example, human bodies included in the whole areas in the images may be detected.

Figure 10:
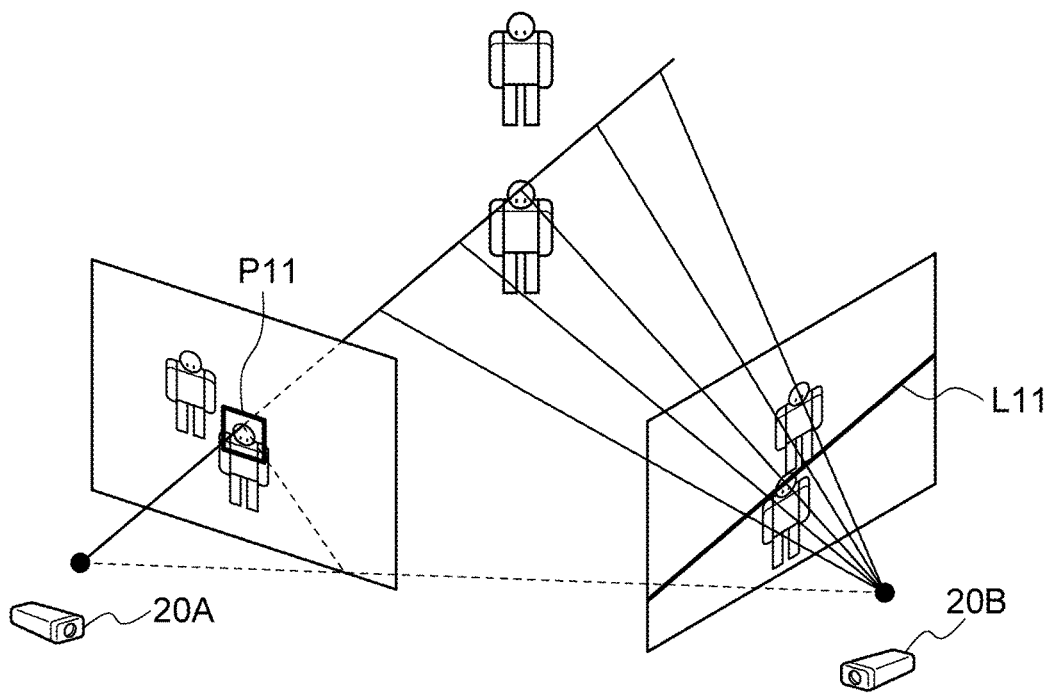
FIG. 10 is a view explaining human-body coordinate indexing in estimating human-body-positions according to one embodiment.

Next, in S33, with respect to the human bodies whose three-dimensional positional coordinates are to be estimated, the human-body-position estimating unit 304 carries out coordinate indexing of the human bodies between the cameras utilizing multi-aspect geometry. Specifically, with such a fact that one point in an image captured by a certain camera corresponds to a line in an image captured by another camera, the human-body-position estimating unit 304 carries out the coordinate indexing of the human bodies between the plurality of images. In other words, the following fact is utilized as shown in FIG. 10, that is, a human body on a point P11 of an image captured by the camera 20A is on a line L11 in an image captured by the camera 20B.

Next, in S34, the human-body-position estimating unit 304 estimates the three-dimensional positional coordinates of the human bodies subject to the coordinate indexing carried out by the cameras 20A and 20B in S33 using the triangulation. In this S34, the human-body-position estimating unit 304 estimates the three-dimensional positional coordinates of the parietal regions of the human bodies as the estimated human-body-positions of the human bodies. It should be noted that the estimated human-body-positions are not restricted to three-dimensional positional coordinates of a parietal region of a human body and may be three-dimensional positional coordinates of a facial center of a human body.

Figure 11:
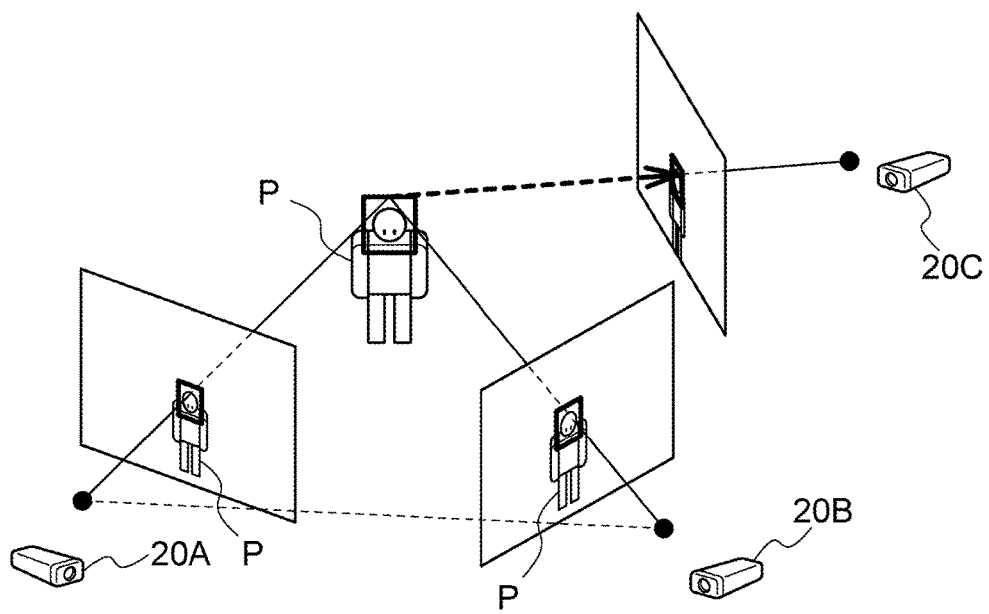
FIG. 11 is a view explaining false-negative complement in estimating human-body-positions according to one embodiment.

In S35, the human-body-position estimating unit 304 complements false-negatives of the human bodies in each camera. For example, as shown in FIG. 11, in a case where the person P coordinated by the camera 20A and 20B is not detected in an image captured by the camera 20C, the human-body-position estimating unit 304 projects three-dimensional positional coordinates of the person P with respect to the image captured by the camera 20C so as to complement false-negatives in the camera 20C. In S36, the human-body-position estimating unit 304 determines whether the three-dimensional positional coordinates have been estimated in regard to all the detected human bodies. The human-body-position estimating unit 304 moves back to S32 when determining that a human body is left whose three-dimensional positional coordinates have not been estimated. Whereas, the human-body-position estimating unit 304 completes the steps shown in FIG. 8 when determining that estimation on the three-dimensional positional coordinates of all the human bodies are completed. It should be noted that the estimation of human-body-positions is an example. In regard to each camera image, not only human-body detection but also human-body chasing may be carried out so as to enhance certainty of the human-body detection.

Referring back to FIG. 6, in regard to the images acquired by the plurality of cameras 20 in S1, in S4, the human-body-area estimating unit 305 estimates the estimated human-body-areas in the images based on the estimated human-body-positions estimated in S3. This step in S4 will be described with reference to FIG. 12.

Figure 12:
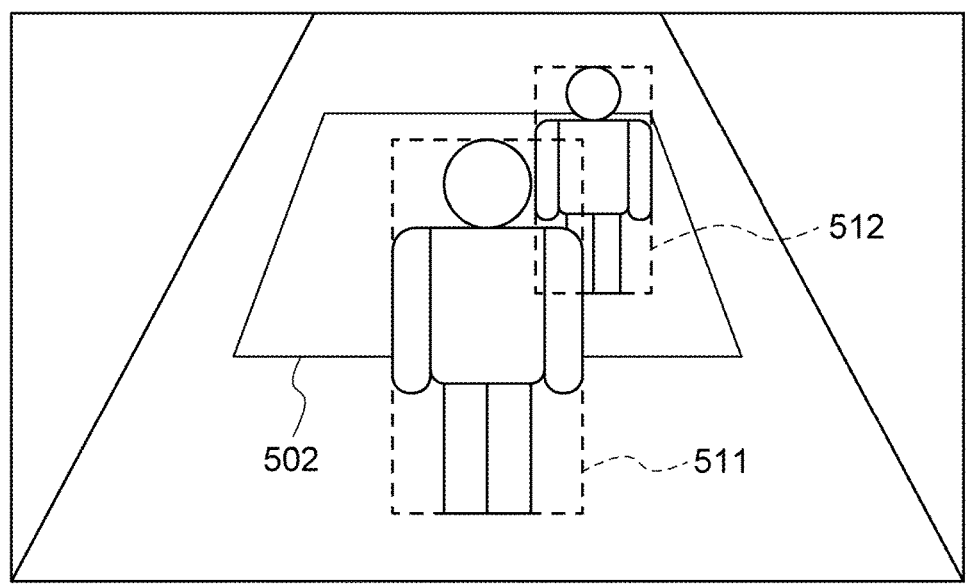
FIG. 12 is a view showing an estimated human-body-area according to one embodiment.

FIG. 12 is an image taken by the camera 20A in the dispositions of the cameras and persons shown in FIG. In this FIG. 12, an area 502 correspond to the area 501 in FIG. 7 seen from the camera 20A. By estimating the human-body-positions in S3, parietal positions of the persons P1 and P2 are estimated. Then, the human-body-area estimating unit 305 sets as the estimated human-body-areas distances from the estimated positional coordinates of the parietal regions to positions corresponding to floor faces in the image. Herein, each estimated human-body-area is represented by a predetermined shape (rectangular shape) including each human body, but it should not be restricted thereto. In regard to the image shown in FIG. 12, the human-body-area estimating unit 305 estimates an estimated human-body-area 511 of the person P1 and an estimated human-body-area 512 of the person P2.

Next, in S5 in FIG. 6, the human-body-area extracting unit 307 determines presence or absence of a human body in the area 501 among the human bodies detected in S3. Specifically, the human-body-area extracting unit 307 determines whether the part corresponding to the floor faces of the estimated human-body-areas estimated in S4 (lower ends of the estimated human-body-area 511 and the estimated human-body-area 512 in FIG. 12) are within the area 502. When determining that the area 501 does not include any human body, the human-body-area extracting unit 307 moves on to S10 which is to be mentioned later. Whereas, when determining that the area 501 includes a human body, in S6, the human-body-area extracting unit 307 extracts an estimated human-body-area corresponding to the human body as the human-body-area.

In a case of the image shown in FIG. 12, the human-body-area extracting unit 307 determines that the estimated human-body-area 511 is out of the area 502 and that the estimated human-body-area 512 is within the area 502. Therefore, in such a case, the human-body-area extracting unit 307 extracts the estimated human-body-area 512 corresponding to the person P2 as the human-body-area.

In S7, the human-body-area extracting unit 307 determines whether the human-body-area extracted in S6 includes an area overlapping with the estimated human-body-area corresponding to the human body determined to be out of the three-dimensional area. When determining that there is no overlapping area, the human-body-area extracting unit 307 moves on to S10 which is to be mentioned later. Whereas, when determining that there is an overlapping area, the human-body-area extracting, unit 307 moves on to S8.

In S8, the human-body-area extracting unit 307 determines whether the overlapping area detected in S7 is to be excluded from the human-body-area. In other words, the human-body-area extracting unit 307 determines whether the overlapping area is to be subject to the image processing (transparency processing) which is to be carried out on the estimated human-body-areas corresponding to the human bodies determined to be out of the three-dimensional area.

Specifically, in S8, the human-body-area extracting unit 307 determines a lengthwise positional relationship with respect to a camera between a human body determined to be within the three-dimensional area 501 in S5 and a human body overlapping with the aforementioned human body. When determining that the human body overlapping with the aforementioned human body is closer the camera than the human body corresponding to the human-body-area determined to be within the three-dimensional area 501, the human-body-area extracting unit 307 determines to exclude the overlapping area from the human-body-area. In other words, the human-body-area extracting unit 307 determines to carry out the transparency processing on the overlapping area. On the other hand, when determining that the human body overlapping with the aforementioned human body is farther from the camera than the human body corresponding to the human-body-area determined to be within the three-dimensional area 501, the human-body-area extracting unit 307 determines not to exclude the overlapping area from the human-body-area. In other words, the human-body-area extracting unit 307 determines not to carry out the transparency processing on the overlapping area.

As shown in FIG. 12, in a case where the human-body-area 512 corresponding to the person P2 includes the area overlapping with the estimated human-body-area 511 corresponding to the person P1, the human-body-area extracting unit 307 determines a lengthwise positional relationship between the persons P1 and P2 based on the estimated human-body-positions of the persons P1 and P2. Herein, as shown in FIG. 7, the person P2 is closer to the camera 20A than the person P1. Therefore, in such a case, the human-body-area extracting unit 307 extracts, as a final human-body-area 512 of the person P2, the area excluding the overlapping area from the human-body-area 512 of the person. P2 determined to be farther from the camera 20A.

Figure 13:
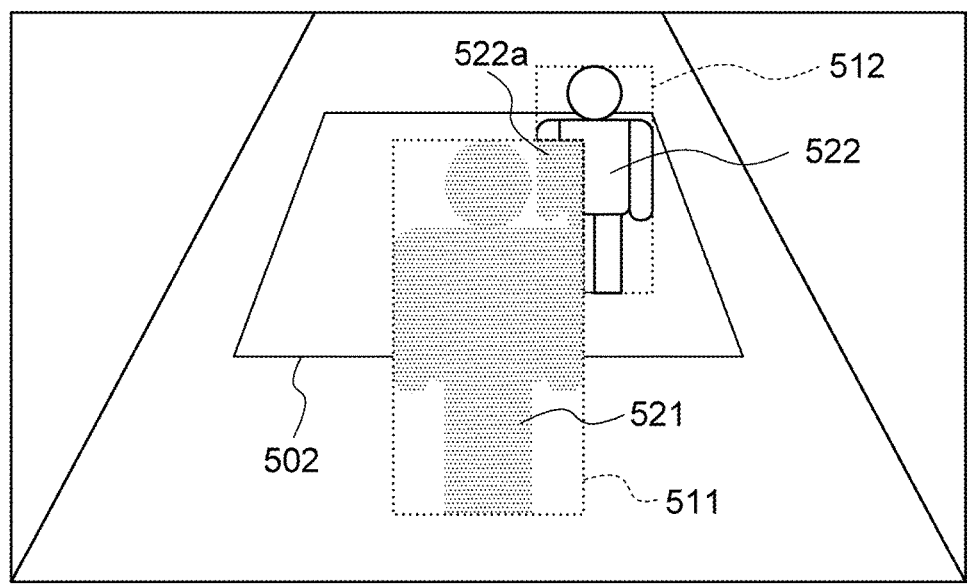
FIG. 13 is a view showing a human-body-area and a transparent area according to one embodiment.

In other words, the overlapping area of the estimated human-body-area 511 and the human-body-area 512 is included in the estimated human-body-area 511 of the person P1 in front of the camera 20A, and the human-body-area 512 corresponding to the person P2 is shaped as shown in FIG. 13. Therefore, similarly to a human-body-part 521 of the person P1, among a human-body part 522 of the person P2, the transparency processing is applied to a human-body part 522*a* overlapping with the estimated human-body-area 511 corresponding to the person P1.

Furthermore, based on the estimated human-body-positions of the human bodies, the human-body-area extracting unit 307 may detect faces near the estimated human-body-positions or may detect human-body-outlines, using shoulder detection or arm detection. Alternatively, the human-body-area extracting unit 307 may extract human-body-areas based on information of detected outlines. Accordingly, it is possible to separate a background from human-body-areas with much higher accuracy and to separate an overlapping part from human bodies. When each estimated human-body-area is formed in a rectangular shape as in the present embodiment, in the human-body-area 512 shown in FIG. 13, for example, there is a possibility that a person out of the area 501 and behind the person P2 may be displayed near the head of the person P2. By detecting outlines, it is possible to avoid situations where a person whose privacy is to be protected is partially displayed. Note that it is possible to obtain an effect similar to a case of detecting the human-body-outlines even when a facial area of a person is detected or when an orientation of a person is determined.

When determining that the overlapping area is to be made transparent in S8 in FIG. 6, the human-body-area extracting unit 307 moves on to S9. Whereas, when determining that the overlapping area is not to be made transparent, the human-body-area extracting unit 307 moves on to S10. In S9, the human-body-area extracting unit 307 excludes the overlapping area extracted in S7 from the human-body-area extracted in S6 and moves on to S10.

In S10, based on the object-areas extracted in S2 and on the human-body-areas extracted from S5 to S9, the composite map generating unit 309 generates a composite map for combining the captured image and background image. At the same time, based on the object-areas detected in S2, the composite map generating unit 309 generates a composite map in which an area excluding the human-body-areas extracted from S5 to S9 becomes a transparent area which is to be made transparent.

Figure 14:
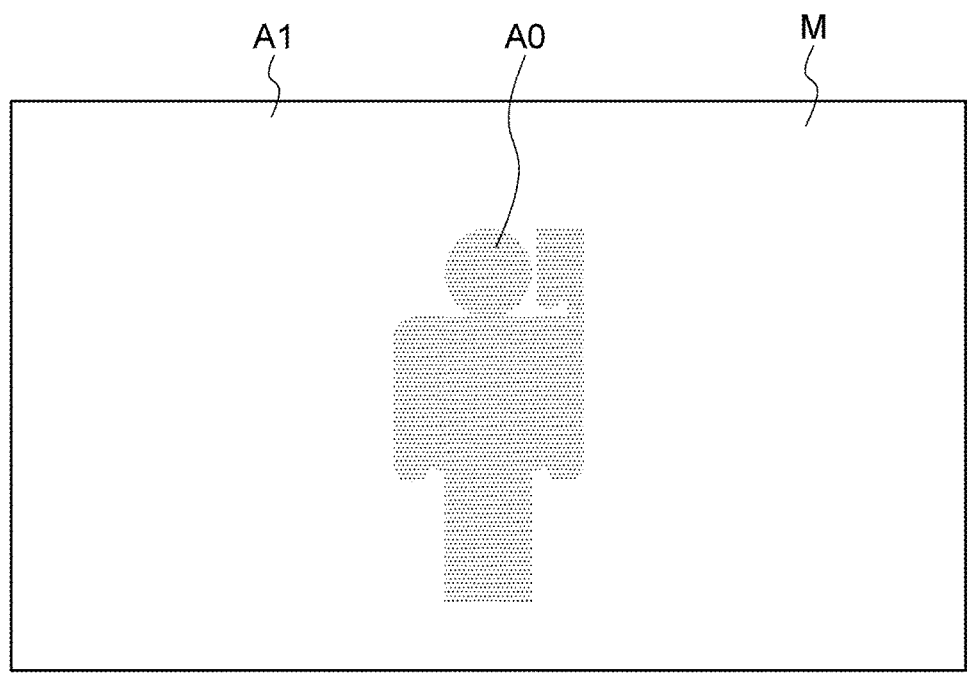
FIG. 14 is an example of a composite map according to one embodiment.

The composite map is a map in which a real number k (note that 0≤k≤1) is allocated to pixels of the transparent area and a real number 1 is allocated to pixels of other areas. Herein, k=0. An example of the composite map corresponding to the image shown in FIG. 13 is shown in FIG. 14. In a composite map M in FIG. 14, a pixel value of an area A0 is k, and a pixel value of an area A1 is 1.

Next, in S11, the image processing unit 310 combines the captured image and background image using the composite map M generated in S10. Herein, the background image is an image, with no person included, captured in advance by the camera 20.

When setting a pixel value of the captured image in pixels (i, j) to $P_A(i, j)$, a pixel value of the background image to $P_B(i, j)$, and transparency of the composite map M to $\alpha(i, j)$, the image processing unit 310 calculates a pixel value P(i, j) of an image after composition as the following Formula.

$$P(i,j)=\alpha(i,j) \times P_A(i,j)+(1-\alpha) \times P_B(i,j) \quad (1)$$

In other words, an area corresponding to the area A1 (pixel value=1) of the composite map M in the image after composition remains as the captured image. In regard to an area corresponding to the area A0 (pixel value=k) in the composite map M, the captured image and background image are blended at a ratio of k to (1−k). In a case where k=0 as in the present embodiment, the area corresponding to the area A0 in the composite map M is thoroughly replaced by the background image. In other words, objects (including human bodies) out of the area 501 are thoroughly replaced by the background image. To the contrary, in a case where the value k is set to 0.1 and the like, semi-transparency processing will be applied. In the semi-transparency processing, the objects (including human bodies) out of the area 501 are translucently displayed and replaced by an image in which a place may be recognized but individuals may not be identified. It should be noted that the value k may be set in advance or may be settable at the discretion of a user.

Next, in S12, the output unit 311 outputs to the displaying, unit 35 the image, where the image processing is applied, generated by the steps through S11. Accordingly, the image where the image processing is applied is presented to the user.

Described herein is a case where the objects out of the area 501 are abstracted. To the contrary, it should be noted that objects within the area 501 may be abstracted. In such a case, an area out of the area 501 is regarded as the three-dimensional area set by the area setting unit 306 and the image analysis and image processing may be carried out on the area.

Furthermore, described herein is a case where the transparency and semi-transparency processing are carried out as the abstraction processing, but blurring processing is also applicable. In such a case, the image processing unit 310 may carry out the blurring processing on the captured image using the transparency of the composite map instead of combining the captured image and background image. Similarly, mosaic processing or paint-out processing may be applicable as the abstraction processing.

As described above, the image processing apparatus 30 acquires a plurality of images captured by the plurality of cameras 20 and estimates three-dimensional positions of specific objects in the images based on the acquired plurality of images. Furthermore, based on the estimate three-dimensional positions of the specific objects, the image processing apparatus 30 extracts an area (first area) including specific objects out of a predetermined three-dimensional area and an area (second area) including specific objects within a predetermined three-dimensional area in the images.

Furthermore, the image processing apparatus 30 specifies an overlapping area of the first area and second area and determines whether the image processing is to be applied to the overlapping area. When determining that the image processing is to be applied to the overlapping area, the image processing apparatus 30 carries out the image processing on the first area including the overlapping area. Whereas, when determining that the image processing is not to be applied to the overlapping area, the image processing apparatus 30 carries out the image processing on the first area excluding the overlapping area. Herein, the specific objects include human bodies.

Accordingly, the image processing apparatus 30 can distinguish the specific objects from other objects in the images and carry out the image processing appropriately. The image processing apparatus 30 determines whether the image processing is to be carried out on the overlapping area of the first area and second area so that it is possible to appropriately specified an area where the image processing is to be applied. Therefore, it is possible to restrain the area where the image processing is to be applied from not being subject to the image processing. To the contrary, it is possible to restrain an area where the image processing is not to be applied from being subject to the image processing.

Furthermore, the image processing apparatus 30 can carry out abstraction processing for abstracting an image before displaying as the image processing. It should be noted that the image processing apparatus 30 may abstract the first area or may abstract the first and second areas in a different manner. The abstraction processing may include any one of the transparency processing, semi-transparency processing, blurring processing, mosaic processing, and paint-out processing.

Accordingly, it is possible to protect privacy of persons out of the specific area or to display persons within the specific area and persons out of the specific area at a different abstraction level.

Furthermore, the image processing apparatus 30 may acquire a background image with no objects captured and may combine a captured image and the background image at a predetermined ratio as the image processing. Herein, the image processing apparatus 30 combine the captured image and background image at a ratio different between the first and second areas. Accordingly, it is possible to display human bodies within the specific area and human bodies out of the specific area with different transparency. For example, it is possible to display the human bodies within the specific area as it is and to make the human bodies out of the specific area transparent and to protect privacy of the persons out of the specific area.

As described above, when carrying out the image processing on the first area, the image processing apparatus 30 determines whether the image processing should be carried out on the overlapping area within the first area. Herein, the image processing apparatus 30 determines lengthwise positional relationships, with respect to the camera 20, of the specific objects corresponding to the first area including the overlapping area and to the second area. The image processing apparatus 30 determines to carry out the image processing on the overlapping area when determining that the specific object corresponding to the first area is in front of the camera 20.

Accordingly, it is possible to appropriately specify the area where the image processing is to be applied. For example, even in a case where a part of estimated human-body-areas of the human bodies within the specific area includes the persons out of the specific area whose privacy should be protected, it is possible to appropriately set a display area. Therefore, it is possible to appropriately restrain the persons whose privacy should be protected from being displayed unexpectedly.

It should be noted that the image processing apparatus 30 may carry out the image processing on the first area including the overlapping area without determining whether the image processing is to be applied to the overlapping area. In such a case, the image processing can be carried out on the overlapping area unconditionally. In other words, it is possible to surely carry out the image processing such as the transparency processing with respect to an area including the human bodies out of the specific area. Therefore, it is possible to surely protect the privacy of the persons out of the specific area.

Furthermore, the image processing apparatus 30 can carry out the similar image processing on the first area excluding the overlapping area and on the overlapping area. In such a case, for example, when the image processing is the transparency processing, the transparency processing is carried out on the entire first area including the overlapping area. In such manners, the similar image processing is applied to the entire first area including the overlapping area so that it is possible to protect the privacy of the persons out of the specific area easily and appropriately.

Furthermore, the image processing apparatus 30 estimates three-dimensional positions of human bodies using the plurality of cameras 20. In estimating the three-dimensional positions of the human bodies, first, based on the plurality of images captured by the plurality of cameras 20, the image processing apparatus 30 detects human bodies coordinated between the plurality of images. Based on the plurality of images, the image processing apparatus estimates three-dimensional positions of the human bodies coordinated among the plurality of images, using the triangulation. Therefore, it is possible to surely determine whether the human bodies are included in the specific area and to appropriately distinguish a specific human body from other human bodies.

Furthermore, the image processing apparatus 30 can detect object-areas of the objects (including human bodies) in the images and carry out any one of the following image processing on an area excluding the first area and second area from the object-areas. That is, the image processing carried out on the first area and the image processing carried out on the second area. In other words, it is possible for the image processing apparatus 30 to display the human bodies within the specific area as they are and not to display the persons out of the specific area and objects other than the human bodies. Furthermore, it is possible for the image processing apparatus 30 to display the human bodies within the specific area and the objects other than the human bodies as they are and not to display the human bodies out of the specific area. In such manners, it is possible to carry out the image processing appropriately in accordance with uses with respect to the objects, other than the specific objects, whose three-dimensional positions are not estimated.

In such manners, the image processing apparatus 30 according to the present embodiment can estimate the positions of the specific objects by estimating the three-dimensional positions with multi-cameras and can carry out appropriate image processing by distinguishing the specific objects within the predetermined three-dimensional area from the specific objects out of the three-dimensional area. Therefore, it is possible to distinguish the persons in specific positions from other persons so that their privacy can be protected appropriately.

Second Embodiment

Hereinafter, a second embodiment according to the present disclosure will be described.

In the first embodiment, compared to a human body corresponding to a human-body-area determined to be within a three-dimensional area, when a human-body overlapping with the human body is determined to be closer to a camera, an overlapping area is made transparent. In the second embodiment, described is a case of complementing an image instead of making it transparent.

Figure 15:
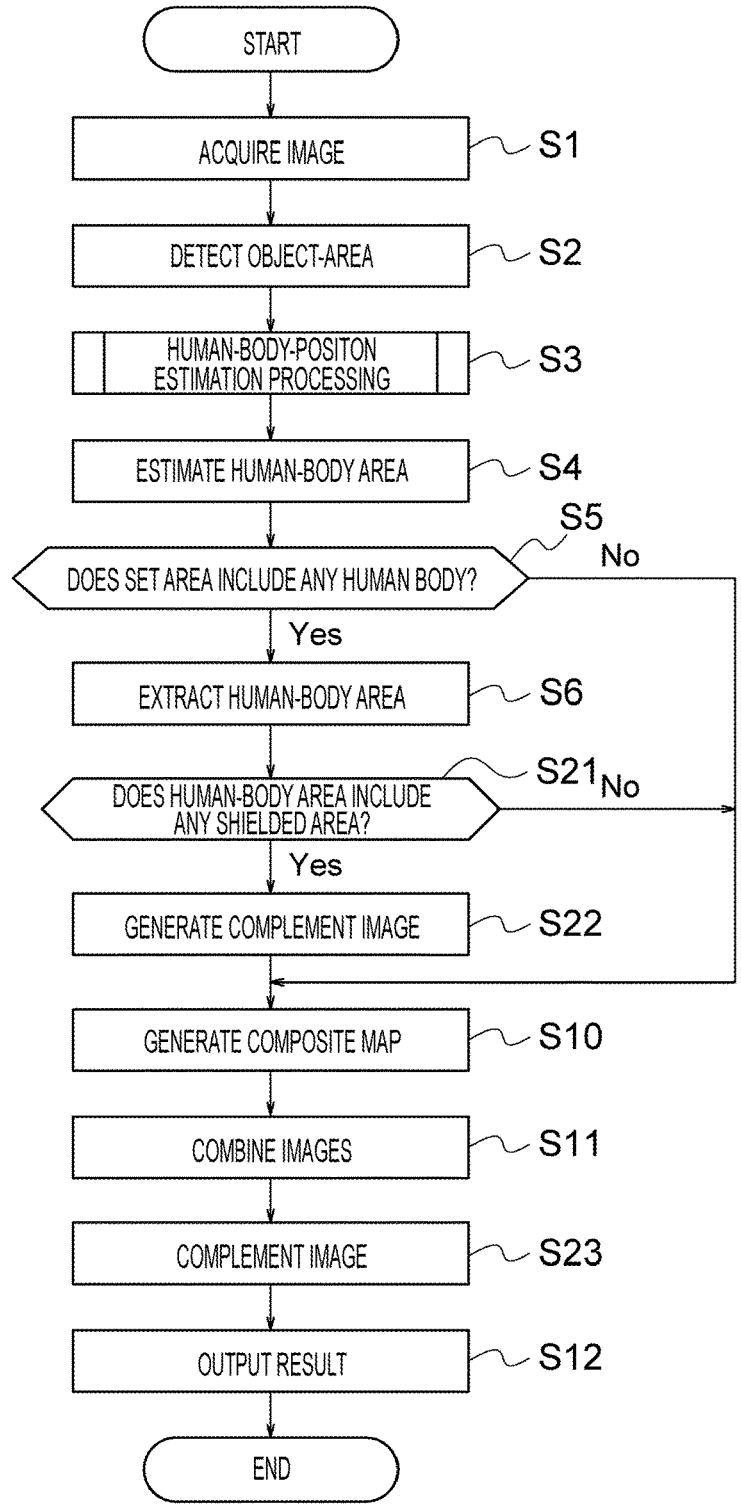
FIG. 15 is a flowchart describing operations of the image processing apparatus according to one embodiment.

FIG. 15 is a flowchart showing operations of the image processing apparatus 30 according to the second embodiment. Steps shown in this FIG. 15 are carried out at a timing similar to the steps shown in FIG. 6. The image processing apparatus 30 can carry out each step shown in FIG. 15 by the CPU 31 reading out a necessary program and executing the program. It should be noted that at least one of elements shown in FIG. 4 may operate as dedicated hardware so as to carry out the steps shown in FIG. 15. In such a case, the dedicated hardware operates based on control of the CPU 31.

The steps shown in FIG. 15 is similar to the steps shown in FIG. 6 except that. S7 to S9 in FIG. 6 are replaced by S21 and S22 and that S23 is added after S11. Therefore, steps similar to those in FIG. 6 will be denoted by the same step numbers, and the following description will focus on steps different from those in FIG. 6.

In S21, the image processing unit 310 determines whether an occluded area is included in the human-body-area extracted in S6. The occluded area is shielded by the estimated human-body-area corresponding to the human body determined to be out of the three-dimensional area. Specifically, first, the image processing unit 310 determines whether the human-body-area extracted in S6 includes any area overlapping with the estimated human-body-area corresponding to the human body determined to be out of the three-dimensional area. Next, when determining that the human-body-area includes an overlapping area, the image processing unit 310 determines a lengthwise positional relationship with respect to a camera between the following human bodies. That is, a human body corresponding to the human-body-area determined in S5 to be within the three-dimensional area 501, and a human body overlapping with the aforementioned human body. In a case where the human body overlapping with the aforementioned human body is determined to be closer to the camera than the human body corresponding to the human-body-area determined to be within the three-dimensional area 501, the image processing unit 310 determines that the occluded area is included in the human-body-area. In other words, the occluded area corresponds to the overlapping area.

As shown in FIG. 12, in a case where the human-body-area 512 corresponding to the person P2 includes the area overlapping with the estimated human-body-area 511 corresponding to the person P1, the image processing unit 310 determines the lengthwise positional relationship between the persons P1 and P2 based on the estimated human-body-positions of the persons P1 and P2. Herein, as shown in FIG. 7, the person P2 is closer to the camera 20A than the person P1. Therefore, in such a case, the image processing unit 310 determines the overlapping area as an occluded area which shields the human-body-area 512.

The image processing unit 310 moves on to S10 when determining in S21 that the occluded area is not included. Whereas, when determining that the occluded area is included, the image processing unit 310 moves on to S22 and complements the image of the occluded area.

Figure 16:
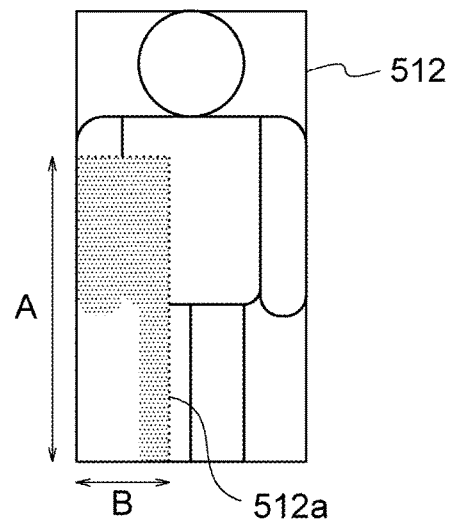
FIG. 16 is a view explaining complement of images according to one embodiment.

In S22, the image processing, unit 310 generates a complemented image in order to complement the image of the occluded area to be complemented. FIG. 16 is a view showing that the human-body-area 512 in FIG. 13 is cut out. The occluded area to be complemented is the area overlapping with the estimated human-body-area 511 within the human-body-area 512, namely, an area 512a shown in FIG. 16.

When complementing the image, first, the image processing unit 310 utilizes the estimated human-body-positions estimated in S3 and estimates an image area, corresponding to the occluded area, captured by another camera. In a case of the image captured by the camera 20A shown in FIG. 16, the image processing unit 310 calculates a percentage and a position of the occluded area 512a with respect to the human-body-area 512. Herein, the percentage of the occluded area 512a can be represented by a percentage A in a longitudinal direction and a percentage B in a lateral direction with respect to the human-body-area 512. Next, the image processing unit 310 applies the calculated percentage and position of the occluded area 512a to the estimated human-body-area corresponding to the person P2 in the image captured by the camera 20B. In such, manner, the image processing unit 310 estimates the image area, corresponding to the occluded area, captured by another camera.

The image processing unit 310 then carries out image conversion such as projection conversion with respect to the image area of aforementioned another camera using percentages A and B of the occluded area 512a with respect to the human-body-area 512 so as to generate a complemented image of the human-body-area 512. This complemented image is an image corresponding to the occluded area 512a shown in FIG. 16.

In a case where a corresponding image area may not be acquired in the image captured by the camera 20B because of the person P2 shielded by other persons and the like, it should be noted that a complemented image may be generated with images captured by the camera 20C, camera 20D, and the like. However, it is desirable that a captured image which is to be a source of generating a complemented image should be an image captured by a camera disposed in a position as close as possible to the camera 20A.

In S23, the image processing unit 310 superimposes the complemented image generated in S22 on the occluded area of the image after composition and generated in S11 so as to complement the image captured by the camera 20A. Herein, as the complement processing, the complemented image is superimposed on the occluded area. However, it should be noted that other images, captured by other cameras, of an area including the image area corresponding to the occluded area may be superimposed near the occluded area in a different frame.

Figure 17:
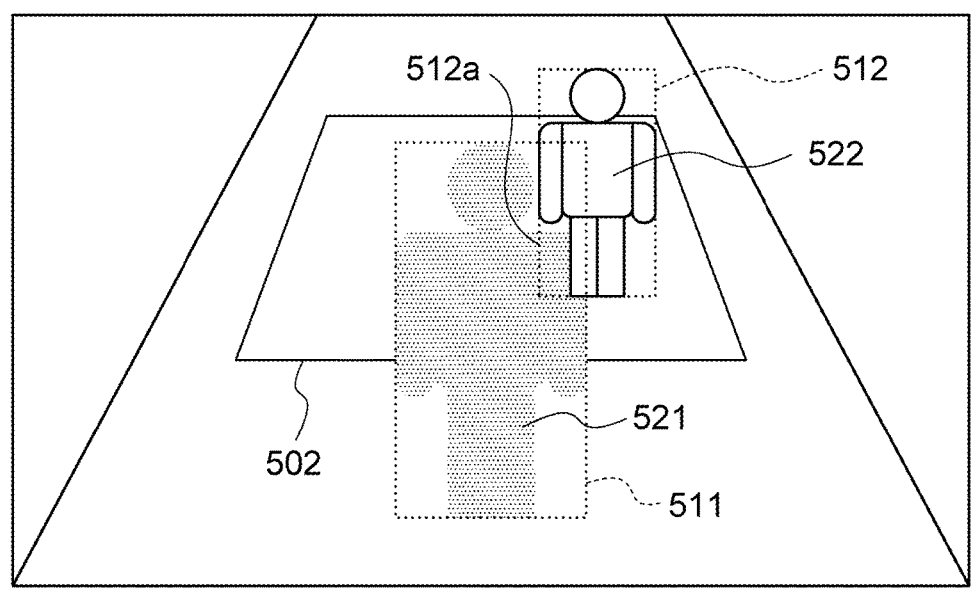
FIG. 17 is another view explaining complement of images according to one embodiment.

By complementing the image, among the human-body part 522 of the person P2, a human-body part overlapping with the estimated human-body-area 511 corresponding to the person P1 is pseudo-reproduced and displayed as shown in FIG. 17. In other words, a human-body part (a leg in FIG. 12) of the person P2 shielded by a human-body part (a shoulder in FIG. 12) of the person P1 can also be displayed by complementing the image. In regard to the human-body part 521 of the person P1 and the human-body part overlapping with the human-body-area 512 corresponding to the person P2, they are properly made transparent.

In such manners, when carrying out the image processing on the first area, the image processing apparatus 30 carries out first-image processing on the first area excluding the overlapping area (occluded area), and second-image processing different from the first-image processing on the overlapping area (occluded area). Herein, the first-image processing may be the abstraction processing such as the transparency processing, while the second-image processing may be the image complement processing in which the occluded area corresponding to the overlapping area in the second area is complemented.

Herein, the image processing apparatus 30 complements the occluded area based on a second image captured by another camera 20 different from the camera 20 by which a first image including the occluded area is captured. Specifically, the image processing apparatus 30 estimates an image area corresponding to the occluded area in the second image.

The image processing apparatus 30 then converts an image of the estimated image area into an image corresponding to the occluded area in the first image by the projection conversion and the like so as to superimpose the image on the occluded area in the first image. Accordingly, the occluded area can be pseudo-reproduced and the image corresponding to the occluded area can be presented to the user.

When the image processing apparatus 30 estimates the image area corresponding to the occluded area in the second image, it should be noted that an image of an area including the estimated image area may be superimposed near the occluded area in the first image. In such a case, the image corresponding to the occluded area can be presented to the user without carrying out intricate processing.

Modification

In the aforementioned embodiments, objects and human bodies are both regarded to be subject to the image processing. It should be noted that the image processing apparatus 30 may not include the object detecting unit 302 and the object-area detecting unit 303 shown in FIG. 4 when the human bodies are regarded to be subject to the image processing.

Furthermore, described in each of the embodiments is a case where the image processing apparatus 30 carries out the image processing, intended to protect privacy of other persons within a specific area. However, the image processing should not be restricted to the aforementioned contents. For example, the image processing apparatus 30 may also carry out the following image processing. That is, human bodies within a specific area are highlighted, intended to easily check a person intruding the specific area. In manners, the contents of the image processing are appropriately selectable in accordance with uses.

Furthermore, described in each of the embodiments is a case where the cameras 20 are the surveillance cameras, but they may be cameras for capturing broadcast video images in public places. In such a case, it is possible to display an announcer within a specific area (for example, a center of a screen) and to blur other objects (including human bodies).

Another Embodiment

A program for achieving at least one of the functions according to the aforementioned embodiments may be supplied to a system or a device over network or through a storing medium, and at least one of processors included in a computer in the system or the device may read the program and execute the same so as to achieve various embodiments of the present disclosure. Furthermore, various embodiments may also be achieved by a circuit performing at least one function (for example, ASIC).

According to an embodiment of the present disclosure, it is possible to distinguish a specific object from other objects within a captured image and to carry out appropriate image processing.

While various embodiments have been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent. Application No. 2016-092680, filed May 2, 2016, which is hereby incorporated by reference herein in its entirety.

What is claimed is:

1. An image processing apparatus, comprising:
circuitry configured to:
acquire a plurality of images respectively captured by a plurality of cameras;
estimate three-dimensional positions of specific objects in the image captured by at least one of the plurality of cameras, based on the acquired plurality of images;
extract a first area and a second area based on the estimated three-dimensional positions of the specific objects, the first area including specific objects outside of a predetermined three-dimensional area and the second area including specific objects within the predetermined three-dimensional area in the image captured by at least one of the plurality of cameras;
specify an overlapping area of the first area and the second area;
carry out image processing on the first area including the specified overlapping area; and
output the image to be displayed after the image processing.

2. The image processing apparatus according to claim 1, further comprising:
the circuitry configured to:
determine a-positional relationship with respect to at least one camera in regard to the specific objects corresponding to the first area including the overlapping area and to the second area based on the three-dimensional positions of the specific objects;
carry out the image processing on the overlapping area when determining that the specific object corresponding to the first area is in front of the camera;
carry out the image processing on the first area including the overlapping area when determining to carry out the image processing on the overlapping area; and
carry out the image processing on an area excluding the overlapping area from the first area determining not to carry out the image processing on the overlapping area.

3. The image processing apparatus according to claim 1, further comprising:
the circuitry configured to:
carry out similar image processing on the first area excluding the overlapping area and on the overlapping area determining to carry out the image processing on the overlapping area.

4. The image processing apparatus according to claim 1, further comprising:
the circuitry configured to:
carry out first-image processing on the first area excluding the overlapping area and second-image processing different from the first-image processing on the overlapping area determining to carry out the image processing on the overlapping area.

5. The image processing apparatus according to claim 4, further comprising:
the circuitry configured to:
complement an occluded area corresponding to the overlapping area in the second area as the second-image processing.

6. The image processing apparatus according to claim 5, further comprising:
the circuitry configured to:
estimate, among the plurality of acquired images, an image area corresponding to the occluded area in a second image captured by the camera different from the camera by which a first image including the occluded area has been captured; and superimpose, near the occluded area of the first image, an image of an area including the image area in the estimated second image.

7. The image processing apparatus according to claim 5, further comprising:

the circuitry configured to:

estimate, among the plurality of acquired images, an image area corresponding to the occluded area in a second image captured by the camera different from the camera by which a first image including the occluded area has been captured; and convert an image of the image area in the estimated second image into an image corresponding to the occluded area in the first image and to superimpose the converted image on the occluded area of the first image.

8. The image processing apparatus according to claim 1, further comprising:

the circuitry configured to:

extract an area including the specific objects in the images as an area having a predetermined shape based on the estimated three-dimensional positions of the specific objects.

9. The image processing apparatus according to claim 1, further comprising:

the circuitry configured to:

detect outlines of the specific objects; and extract an area including the specific objects in the images based on outline information detected by the outline detection unit.

10. The image processing apparatus according to claim 1, wherein the image processing involves abstraction processing in which the images are abstracted before display.

11. The image processing apparatus according to claim 10, further comprising:

the circuitry configured to:

carry out, as the abstraction processing, any one of transparency processing, semi-transparency processing, blurring processing, mosaic processing, and paint-out processing.

12. The image processing apparatus according to claim 10, further comprising:

the circuitry configured to:

make a composite image of each image and a background image as the abstraction processing.

13. The image processing apparatus according to claim 1, wherein the specific objects include human bodies.

14. The image processing apparatus according to claim 13, further comprising:

the circuitry configured to:

acquire a plurality of images respectively captured by a plurality of cameras;

detect human bodies in the plurality of acquired images; and estimate positions in a three-dimensional space of the detected human bodies based on positions of the plurality of cameras in the three-dimensional space and based on positions of the human bodies in the plurality of acquired images.

15. The image processing apparatus according to claim 14, further comprising:

the circuitry configured to:

determine whether estimated positions of human bodies in a three-dimensional space are included in a predetermined range; and abstract human bodies determined to be within the predetermined range.

16. An image processing method, comprising:

a step in which a plurality of images respectively captured by a plurality of cameras is acquired;

a step in which three-dimensional positions of specific objects in the image captured by at least one of the plurality of cameras are estimated based on the plurality of images;

a step in which a first area including specific objects outside of a predetermined three-dimensional area and a second area including specific objects within the predetermined three-dimensional area in the image captured by at least one of the plurality of cameras are extracted based on the three-dimensional positions of the specific objects;

a step in which an overlapping area of the first area and the second area is specified;

a step in which image processing is applied to the first area including the overlapping area; and a step in which the image is outputted after the image processing to display circuitry.

17. A non-transitory computer readable storage medium storing instructions which, when executed, cause a computer to carry out an image processing method, the method comprising:

a step in which a plurality of images respectively captured by a plurality of cameras is acquired;

a step in which three-dimensional positions of specific objects in the image captured by at least one of the plurality of cameras are estimated based on the plurality of images;

a step in which a first area including specific objects outside of a predetermined three-dimensional area and a second area including specific objects within the predetermined three-dimensional area in the images are extracted based on the three-dimensional positions of the specific objects;

a step in which an overlapping area of the first area and the second area is specified;

a step in which image processing is applied to the first area including the overlapping area; and a step in which the image is outputted after the image processing to display circuitry.

* * * * *